Oct. 6, 1953

J. H. STARR 2,654,302

POWER LIFT

Original Filed Feb. 26, 1945

*INVENTOR.*
JOHN H. STARR

BY

ATTORNEYS

Patented Oct. 6, 1953

2,654,302

UNITED STATES PATENT OFFICE 2,654,302

POWER LIFT

John H. Starr, Mayville, Wis., assignor to John Deere Van Brunt Company, a corporation of Wisconsin Continuation of application Serial No. 579,870, February 26, 1945. This application January 2, 1952, Serial No. 264,607

5 Claims. (Cl. 97—46.31)

This is a continuation of my copending application, Serial No. 579,870, filed February 26, 1945, now abandoned.

The present invention relates generally to agricultural implements and more particularly to power operated mechanism for raising and lowering the tools and other parts associated therewith.

The object and general nature of the present invention is the provision of a new and improved means for attaching the power cylinder of a hydraulic power lift device to the implement so as to make it convenient to readily attach and detach the hydraulic unit from the implement so that the hydraulic unit, which is generally in the form of a jack or ram, may remain in operative connection with the tractor which ordinarily propels the implement. Further, it is a feature of this invention to provide a new and improved quick detachable bracket by which the attachment and detachment of the cylinder device may readily be accomplished but without any danger of the parts becoming disconnected or loosened during operation of the implement so as to render the power lift thereof defective or unreliable.

These and other objects and advantages of the present invention will be apparent to those skilled in the art after a consideration of the following detailed description, taken in conjunction with the accompanying drawings in which one preferred embodiment of this invention has been illustrated.

Figure 1:
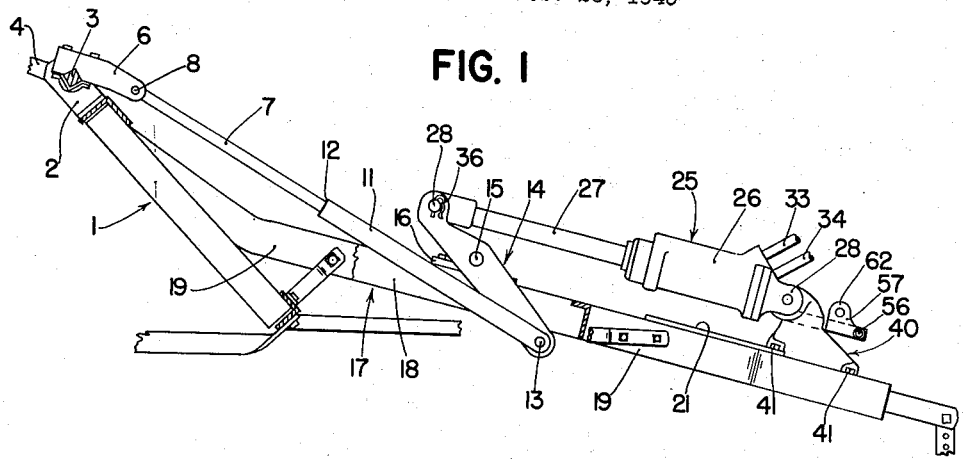
Figure 1 is a side view of portions of the frame of a field cultivator having power lift mechanism for raising or lowering the tools and means constructed according to the principles of the present invention for attaching and detaching the power lift unit.

Referring now more particularly to Figure 1, the frame of the agricultural implement, such as a field cultivator, is indicated by the reference numeral 1, and mounted on the frame 1 by suitable brackets 2 is a pressure shaft 3 to which pressure arms 4 are fixed in the usual way. The tools (not shown) are connected with the rear ends of the pressure arms 4. A raising and lowering arm 6 is fixed in any suitable manner to the pressure shaft 3 and the rear end of a link 7 is pivoted, as at 8, to the outer end of the arm 6. A U-shaped link part 11 is welded, as at 12, to the front end of the link 7 and at its front the U-shaped member 11 is pivoted at 13 to a lever 14 which is swingably mounted, at 15, on a bracket 16 carried by a part of the hitch frame 17. The latter includes rearwardly diverging angle members 18 and 19, the forwardly converging ends of which are connected together by a plate 21.

For operating the pressure shaft 3 by power derived from the tractor to which the field cultivator is connected, I provide a double acting hydraulic unit 25 which includes a cylinder 26 and a piston rod 27. The latter is connected by a pin 28' to the upper end of the arm or lever 14 and the front end of the cylinder is provided with a pair of apertured ears 28 and 29, see Figure 2, which receive a pin 30 extending therebetween and normally permanently mounted in place. A pair of hose lines 33 and 34 lead from the ram unit 25 to a hydraulic power unit (not shown) mounted on the tractor and equipped with suitable valve mechanism whereby the piston rod 27 may be extended or retracted to swing the lever 14 and thus rock the pressure shaft 3 to raise and lower the tools. The rear end of the piston rod 27 may be readily removed from the upper end of the lever 14, which is bifurcated, by taking out a quick detachable spring connector 36 when removing the pin 28'. The means for making the front end of the cylinder 25 quickly detachable will now be described.

A bracket 40, preferably in the form of a casting, is bolted, as at 41, to the forward end portions of the angles 18 and 19 and is provided at its upper portion with a cylinder-receiving section 43 which includes a rearwardly facing hook portion 44. The upper portion 43 of the bracket 40 is widened, as at 45, to provide sufficient stock to form a through opening 47 in the bracket 40 extending generally from front to rear.

Figure 2:
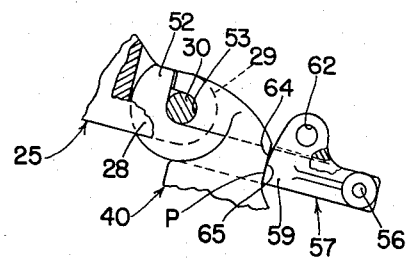
Figure 2 is an enlarged view, partly in section, showing the manner of holding the power lift cylinder in place.
Figure 3:
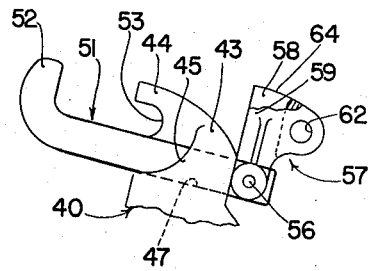
Figure 3 is a view similar to Figure 2, showing the attaching bracket parts in their cylinder-releasing position.
Figure 4:
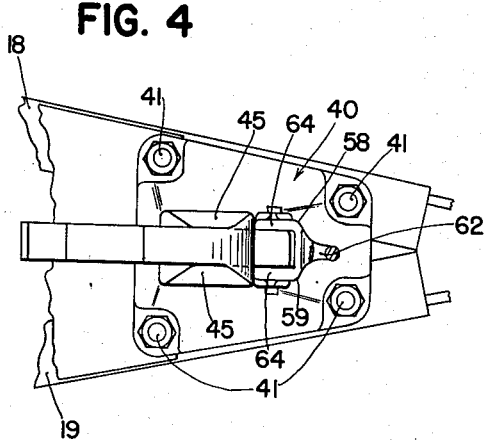
Figure 4 is a partial enlarged plan view of the attaching bracket construction, the power cylinder being removed.
Figure 5:
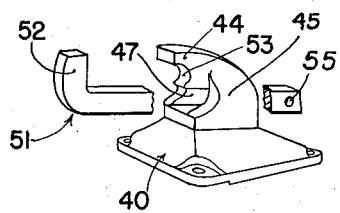
Figure 5 is a perspective view of the bracket that is normally fixed to the implement.
Figure 5:

Slidably mounted in the opening 47 is a shiftable member 51 having a hook portion 52 arranged in upstanding relation and long enough to substantially come into contact with the rear end of the hook portion 44 when the pin 30 of the cylinder is held in place in a socket portion 53 formed in the bracket 40, as best shown in Figures 2 and 3. The opposite or outer end of the slidable member 51 is apertured at 55 to receive a pin 56 by which a detent member 57 is pivoted to the slidable members 51. The detent member 57 is generally of U-shaped construction, as best shown in Figure 4, having bifurcated or side portions 58 and 59 which are adapted to lie on opposite sides of the front end of the slidable member 51, as best shown in Figures 1 and 2. The member 57 includes an upwardly extended portion rounded and apertured, as at 62, to form a finger hold by which the detent 57 may be lifted manually away from the slidable member 51 when it is desired to detach the ram unit 25. The rear edges of the side portions 58 and 59 are rounded or otherwise shaped, as at 64, so that when the detent member 57 is in the position shown in Figure 2, it contacts companion shouldered portion 65 on the bracket 40 at a point, as at P (Figure 2), which lies below a line connecting the pin 30 and the detent pivot pin 56, whereby any separating movement between the ram unit 25 and the bracket 40 does not tend to swing the detent 57 upwardly, tending, instead, to hold the detent 57 in its locked position (Figure 2).

In operation, whenever, it is desired to disconnect the ram unit 25 from the implement, all that it is necessary to do is to remove the spring connector 36 (Figure 1) and slide out the pin 28' in order to release the piston rod 27, and then lift up on the pivoted detent 57 so as to make it possible to slide the member 51 rearwardly in the opening 47 in the bracket 40, whereupon the front end of the ram unit 25, including the pin 30 (Figure 2), can be lifted from the bracket 40. In a matter of a few seconds, therefore, the ram unit 25 may readily be detached from the implement. Replacing the ram unit 25 is as readily accomplished and involves merely a reversal of the above enumerated steps.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In an agricultural implement including a quick detachable power cylinder releasably mounted on the implement, said cylinder having an attaching pin, a bracket fixed to said implement and having a hook-like portion adapted to receive said pin, a transverse opening formed in said bracket, a slidable member movably mounted in said opening and having a pin-engaging portion adapted to engage said cylinder pin and hold the latter in said hook-like portion, and a detent pivotally connected at one end to the outer end of said slidable member and adapted to be moved into a position acting between said bracket and the outer end of said member, the other end of said detent being rounded so as to engage the adjacent portion of the bracket at a point below a line connecting the cylinder pin and the pivot of the detent on said slidable member for holding the latter in a cylinder-retaining position.

2. In an agricultural implement including a quick-detachable power cylinder releasably mounted on the implement, said cylinder having an attaching pin, the improvement comprising a bracket adapted to be fixed to said implement and having a hook-like portion adapted to receive said pin, a transverse opening formed in said bracket substantially directly underneath said hook-line portion, a slidable member movably mounted in said opening and having a pin-engaging portion adapted to engage said cylinder pin and hold the latter in said hook-like portion, and a detent pivotally connected at one end to the outer end of said slidable member and adapted to be moved into a position acting between said bracket and the outer end of said member, the other end of said detent being rounded so as to engage the adjacent portion of the bracket at a point below a line connecting the cylinder pin and the pivot of the detent on said slidable member for holding the latter in a cylinder-retaining position.

3. In an agricultural implement including a quick detachable power cylinder releasably mounted on the implement, said cylinder having an attaching pin, a bracket fixed to said implement and having a portion adapted to receive said pin, a transverse opening formed in said bracket, a slidable member movably mounted in said opening and having a pin-engaging portion adapted to engage said cylinder pin and hold the latter in the pin-receiving portion of said bracket, and a detent pivotally connected at one end to the outer end of said slidable member and adapted to be moved into a position acting between said bracket and the outer end of said member, the other end of said detent being rounded so as to engage the adjacent portion of the bracket at a point below a line connecting the cylinder pin and the pivot of the detent on said slidable member for holding the latter in a cylinder-retaining position.

4. In an agricultural implement including a quick-detachable power cylinder releasably mounted on the implement, said cylinder having an attaching pin, the improvement comprising a bracket adapted to be fixed to said implement and having a portion adapted to receive said pin, a transverse opening formed in said bracket substantially directly underneath said pin-receiving portion, a slidable member movably mounted in said opening and having a pin-engaging portion adapted to engage said cylinder pin and hold the latter in the pin-receiving portion of said bracket, and a detent pivotally connected at one end to the outer end of said slidable member and adapted to be moved into a position acting between said bracket and the outer end of said member, the other end of said detent being rounded so as to engage the adjacent portion of the bracket at a point below a line connecting the cylinder pin and the pivot of the detent on said slidable member for holding the latter in a cylinder-retaining position.

5. A quick-detachable connection for the removable power cylinders of agricultural implements and the like having at one end a pair of laterally spaced apertured ears carrying a pin therein, comprising a relatively stationary bracket having an opening therethrough and a pin-receiving portion extending from said bracket immediately above said opening, a member slidable in said opening relative to the bracket and including an upwardly extending pin-engaging portion having a width substantially the same as the distance between said spaced ears of said cylinder and adapted to engage said pin-receiving portion so as to cooperate with the latter to hold the cylinder in position relative to said bracket, said upwardly extending, pin-receiving portion of said bracket having a width substantially equal to the width of the pin-engaging portion of said slidable member and the distance between said spaced ears, so as to pass between and substantially contact the inner faces of said laterally spaced ears and thereby limit lateral movement of the cylinder relative to said bracket, and means acting between said member and said bracket for holding the member in a position connecting said cylinder to said bracket.

JOHN H. STARR.

References Cited in the file of this patent

UNITED STATES PATENTS

| Number | Name | Date |
|---|---|---|
| 536,780 | Dalpe | Apr. 2, 1895 |
| 805,949 | Facette | Nov. 28, 1905 |
| 1,559,653 | Stucker et al. | Nov. 3, 1925 |
| 2,292,961 | Mott | Aug. 11, 1942 |
| 2,320,168 | Benjamin et al. | May 25, 1943 |
| 2,361,362 | Altgelt | Oct. 31, 1944 |

FOREIGN PATENTS

| Number | Country | Date |
|---|---|---|
| 648,699 | Germany | July 15, 1937 |